United States Patent [19]
Beckmann et al.

[11] Patent Number: 5,350,001
[45] Date of Patent: Sep. 27, 1994

[54] TIRE HAVING A TREAD SURFACE WITH FINE CUT-OUTS AT THE TIRE TREAD SURFACE

[75] Inventors: Otto Beckmann, Traiskirchen; Helmut Loidl, Sparbach; Ernst Petraschek, Modling, all of Austria

[73] Assignee: Semperit Reifen Aktiengesellschaft, Traiskirchen, Austria

[21] Appl. No.: 885,964

[22] Filed: May 20, 1992

[30] Foreign Application Priority Data

May 21, 1991 [AT] Austria .................. 1029/91

[51] Int. Cl.⁵ ............................. B60C 11/12
[52] U.S. Cl. .................. 152/209 R; 152/DIG. 13
[58] Field of Search ......... 152/209 R, 209 D, DIG. 3

[56] References Cited

U.S. PATENT DOCUMENTS

| | | | |
|---|---|---|---|
| 4,566,514 | 1/1986 | Maük et al. | 152/209 R |
| 4,794,965 | 1/1989 | Lagnier | 152/209 R |
| 4,994,126 | 2/1991 | Lagnier | 152/209 R |

FOREIGN PATENT DOCUMENTS

| | | |
|---|---|---|
| 0125437 | 11/1984 | European Pat. Off. . |
| 0131246 | 1/1985 | European Pat. Off. . |
| 0282765 | 9/1988 | European Pat. Off. . |
| 0378090 | 7/1990 | European Pat. Off. . |
| 1480932 | 2/1969 | Fed. Rep. of Germany . |
| 3324649 | 1/1985 | Fed. Rep. of Germany . |
| 4107547 | 9/1991 | Fed. Rep. of Germany . |
| 0050805 | 3/1986 | Japan .............. 152/209 R |
| 0204807 | 8/1989 | Japan .............. 152/DIG. 3 |
| 2246810 | 10/1990 | Japan .............. 152/209 D |

*Primary Examiner*—Michael W. Ball
*Assistant Examiner*—Nancy T. Krawczyk
*Attorney, Agent, or Firm*—Sandler, Greenblum & Bernstein

[57] ABSTRACT

The lamella fine cut-outs provided in profile elements of the tread surface of a tire, have three-dimensionally structured wall regions. Such wall regions restrict relative movements of the mutually facing wall regions in lateral as well as in radial direction. In such manner there are improved the travel characteristics as well as the wear characteristics like break-outs and irregular wear of such lamella tires.

24 Claims, 9 Drawing Sheets

TIRE HAVING A TREAD SURFACE WITH FINE CUT-OUTS AT THE TIRE TREAD SURFACE

BACKGROUND OF THE INVENTION

1. Field of the Invention

The present invention relates to a new and improved tire including a tread surface or portion.

In its more specific aspects, the present invention particularly relates to an improved tire including a tread surface or portion which comprises profile elements such as blocks, ribs and the like extending in circumferential direction. These profile elements are provided with lamella fine cut-outs or incisions defining wall regions of a non-planar configuration.

The present invention further relates to improved tire mold lamellae for producing lamella fine cut-outs or incisions in tire tread surfaces.

2. Discussion of Background and Material Information

It is known in the art that the sliding friction which occurs between the tire and the ground during normal rolling and upon braking and accelerating, plays an essential role with respect to the gripping characteristics or properties of a tire. There is always present a certain amount of skid or slip between the ground and the tire of a travelling vehicle. During braking and accelerating as well as during travel through curves the amount of skid or slip is substantially greater than during normal rolling or travel of the tire.

It is also known that reducing the skid will assist in improving the gripping and adhesion characteristics as well as the handling characteristics of the tires. Therefore, maintaining the skid at a minimum is a central aspect of tire development. The measures heretofore undertaken for this purpose, on the one hand, were carried out on with respect to the mixture composition for the tread surfaces and, on the other hand, from the standpoint of tread construction, i.e. by correspondingly structuring the tread surface profile. The contribution made thereto by the mixture composition, can be briefly summarized in that the tread surface rubber must be capable of permitting cyclic deformations during sliding of the tire upon ground irregularities in order to thereby consume part of the kinetic energy. As a constructional measure it has heretofore proven useful to form lamella fine cut-outs or incisions of a width in the range of 0.4 to about 0.8 mm. in the profile elements in order to provide additional gripping edges which contribute to reducing skid or slip. The skid reducing effect of fine cut-outs or incisions in the tire, however, is not merely the result of additional gripping edges. Above all, particularly on a dry roadway and in the presence of strong tire deformations, which also are the conditions present during a tire handling test, the mutually facing walls of the tire fine cut-outs or incisions are subject to high frictional engagement. The thus produced friction losses are taken from the kinetic energy of the tire and thus likewise act in a skid reducing manner.

However, it has been found that conventional lamella formation in the tread surface profile nevertheless causes some deterioration in handling. The reason therefore is that tire fine cut-outs or incisions always tend to render more labile or unsteady the contact geometry of the tire. At high travelling speeds this unsteadiness will be more dominant than the positive effects due to the additional gripping edges or the dissipated friction energy.

Further disadvantages which may result from tire fine cut-outs or incisions, reside in their tendency to capture stones or gravel, promoting break-outs which start from the base of the tire fine cut-outs or incisions, and irregular wear.

In order to moderate the disadvantages of fine cut-outs or incisions, it is known in the art and a frequent practice to reduce the depth of the fine cut-outs or incisions, either across the entire width of the fine cut-out or incision or only in sections thereof. This means, however, that during the service life of the tire such raised fine cut-outs or incisions are sooner or later entirely or partially lost, as a result of which there will surely result a more or less abrupt deterioration in the gripping characteristics or properties of the tires.

Furthermore, it is known in the art to use, instead of totally planar tire fine cut-outs or incisions, cut-outs or incisions which are wave or zig-zag shaped as seen in radial top plan view. In this manner, the slippage or sliding past one another of mutually facing wall halves of the fine cut-outs or incisions in lateral direction is rendered substantially more difficult. In comparison with entirely planar tire fine cut-outs or incisions there is thus obtained, above all, a handling advantage.

There are, however, also known fine cut-outs or incisions where the zig-zag or wave configuration extends into the depth of the tire. In this manner there are formed transversely oriented edges within the fine cut-outs or incisions and these are used, for example, according to German Published Patent Application No. 1,480,932 for preventing stones from penetrating or further migrating toward the radial-ply construction. Furthermore, as described, for example, in European Published Patent Application No. 0,282,765, there have been proposed mirror-image pairs of fine cut-outs or incisions containing a zig-zag configuration extending in the depth direction. The thus resulting, always mutually opposed inclination of pairs of fine cut-outs or incisions are intended to particularly improve upon the tire grip at a wet, snowy or icy roadway. Additionally, the in-depth extending zig-zag configuration further has the effect that the relative movements of the adjoining walls with respect to each other progressively decrease toward the base of the tire fine cut-outs or incisions. The risk of fissure formation at the base of the tire cut-outs or incisions is thereby suppressed and there is also diminished the tendency of irregular wear.

All heretofore existing wave or zig-zag shaped and non-planar tire fine cut-outs or incisions restrict the relative movement of the adjoining walls with respect to each other only in the direction of extent of the wave or zig-zag configuration. In a direction perpendicular thereto the walls of the fine cut-outs or incisions can be described as continuous straight wall extents.

SUMMARY OF THE INVENTION

Therefore, with the foregoing in mind, it is a primary object of the present invention to achieve, in a tire of the initially mentioned type, an improvement in handling, in the resistance to the formation of fissures which extend from the base of the fine cut-outs or incisions, as well as suppression of irregular wear.

A further important object of the present invention resides in providing a tire of the initially mentioned type in which the friction is increased between the adjoining walls of the fine cut-outs or incisions due to deformations which are produced as a result of braking, accelerating or curve travel.

It is another important object of the present invention to provide a tire of the initially mentioned type in which the friction between the adjoining walls of the fine cut-outs or incisions is increased in order to thereby use this energy-dissipating component for reducing the tire skid.

Now in order to implement these and still further objects of the present invention, which will become more readily apparent as the description proceeds, the present development is manifested, among other things, by lamella fine cut-outs or incisions which at least partially comprise mutually associated three-dimensionally structured wall regions having edges as well as protruding or salient and receding surfaces. It is thus ensured that the wall regions of the fine cut-outs or incisions do not contain continuous straight portions in any direction. Preferably, the edges of the structured wall regions are arcuately curved and/or form a network and/or are branched with respect to each other.

Thus, the invention renders possible, in a relatively simple manner, maintaining small the relative movements of the adjoining walls of tire fine cut-outs or incisions in lateral and in radial direction, and additionally, effectively converts part of the kinetic energy of the skidding tire into heat via friction. The structure of the wall regions of the lamella fine cut-outs or incisions leaves unaffected their primary purpose, namely forming additional gripping edges in the profile or profiled tread surface.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1b shows an axonometric view of a section of the tire mold lamella formed by embossing the planar lamella sheet blank shown in FIG. 1a;

FIG. 2b shows an axonometric view of a section of the tire mold lamella formed by embossing the planar lamella sheet blank shown in FIG. 2a;

FIG. 3b shows an axonometric view of a section of the tire mold lamella formed by embossing the planar lamella sheet blank shown in FIG. 3a;

FIG. 4b shows an axonometric view of a section of the tire mold lamella formed by embossing the planar lamella sheet blank shown in FIG. 4a;

FIG. 5b shows an axonometric view of a section of the tire mold lamella formed by embossing the planar lamella sheet blank shown in FIG. 5a;

FIG. 6b shows an axonometric view of a section of the tire mold lamella formed by embossing the planar lamella sheet blank shown in FIG. 6a;

FIG. 7b shows an axonometric view of a section of the tire mold lamella formed by embossing the planar lamella sheet blank shown in FIG. 7a;

FIG. 8b shows an axonometric view of a section of the tire mold lamella formed by embossing the planar lamella sheet blank shown in FIG. 8a.

DETAILED DESCRIPTION OF THE PREFERRED EMBODIMENTS

Figure 1A:
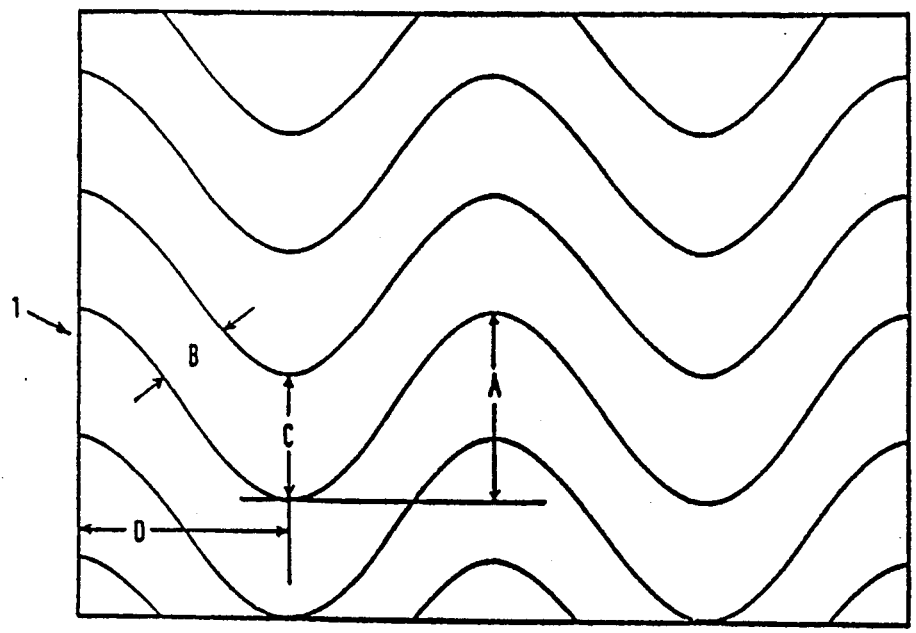
FIG. 1a shows a top plan view of part of a first exemplary embodiment of the inventive tire mold lamella in the form of a planar lamella sheet blank with indicated bending lines.

All of the exemplary embodiments of the tire mold lamellae or the fine cut-outs or incisions structured according to the invention and illustrated in the drawings can be manufactured by embossing the lamella sheet blanks and thus can be produced in a very simple manner.

In the drawings, the illustration has been selected such that the top end region of the respective lamella sheet corresponds to the end region of the fine cut-out or incision which is associated with the road surface in the final tire. The anchoring of the lamella sheets in the tire mold need not be here described in any greater detail because this operation can be carried out in conventional manner. It is also possible, for example, to cast the lamella sheets into the tire mold and, in this manner, the entire lamella may contain the embossed structure according to the present invention. Lamella sheets which are constructed according to the invention, may also be inserted into eroded molds. In such case, the contact location at the mold must be constructed correspondingly in order to permit its insertion into the tire mold.

Figure 1B:
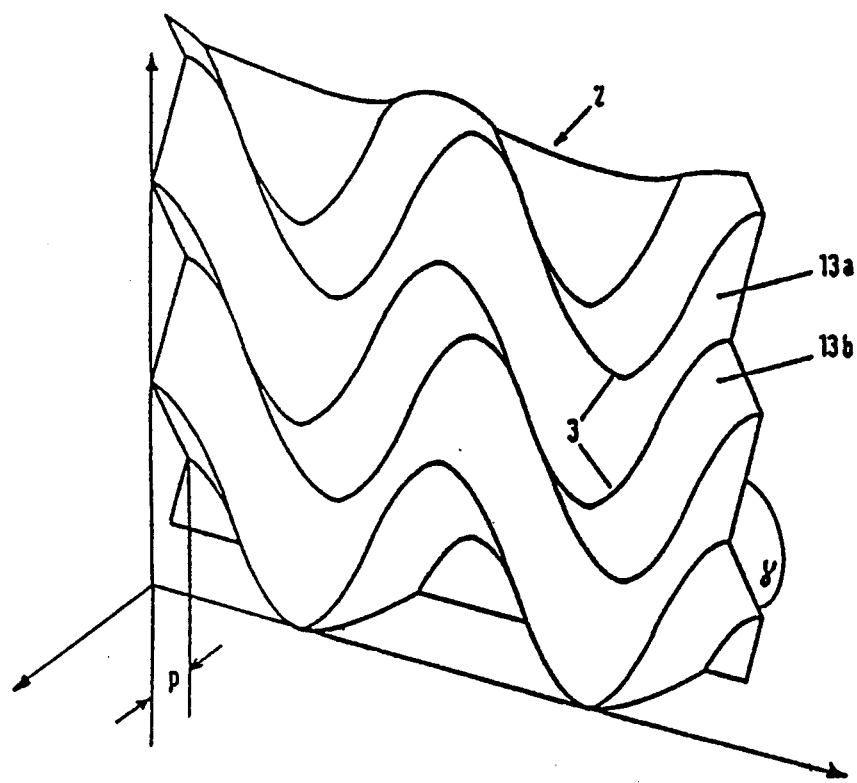

FIG. 1b shows an exemplary embodiment of a lamella 2 which includes wave-shaped or sinusoidal bending lines 3 extending substantially parallel to each other and associated with a substantially transverse direction. Across the width of the lamella 2, a number of maxima and minima of the wave form are shown. As will be seen in FIG. 1a, the wave forms are displaced relative to each other by an amount C. The minimum mutual spacing B resulting therefrom between adjacent wave forms is selected in the range of 0.5 mm. to 3 mm. and preferably amounts to about 1.2 mm. The amplitude A of the wave forms in the lamella sheet 1 should not be smaller than C/2 and not greater than 3C. The length D corresponds to one-quarter of the wavelength.

During forming or embossing the lamella 2, the sheet metal blank 1 is bent along the bending lines 3 to obtain a predetermined bending angle $\gamma$. Preferred bending angles $\gamma$ are in the range of 150° to 90°. In the axonometric illustration of lamella 2 shown in FIG. 1b, the angle $\gamma$ is selected to be 120°. During the forming operation, the length D is decreased and the amplitude A is increased and there are formed non-planar surfaces 13a and 13b. The embossing depth p which is also evident from FIG. 1b, is selected in the range of 0.5 mm. to 3 mm. and preferably amounts to 1.8 mm. The lamella sheet metal itself is selected to have a thickness of about 0.4 mm. to 0.8 mm.

In the event that hereinafter in the description of the following exemplary embodiments, nothing different is mentioned, then, the aforementioned dimensions regarding the spacing between adjacent bending lines, the embossing depth and the thickness of the lamella sheet are also valid for these variants.

Figure 2A:
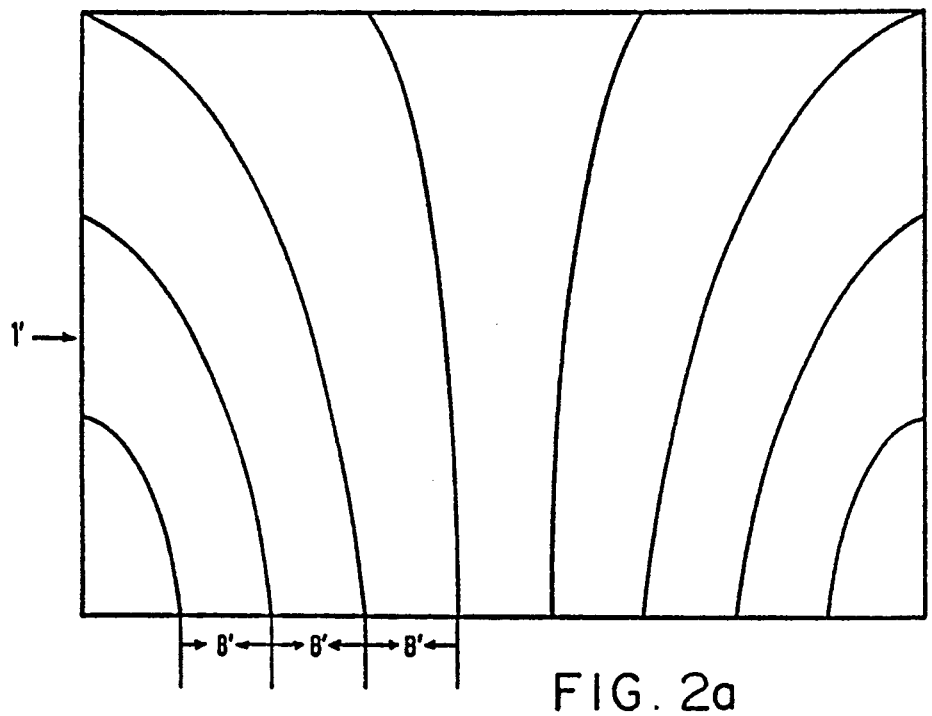
FIG. 2a shows a top plan view of part of a second exemplary embodiment of the inventive tire mold lamella in the form of a planar lamella sheet blank with indicated bending lines.
Figure 2B:
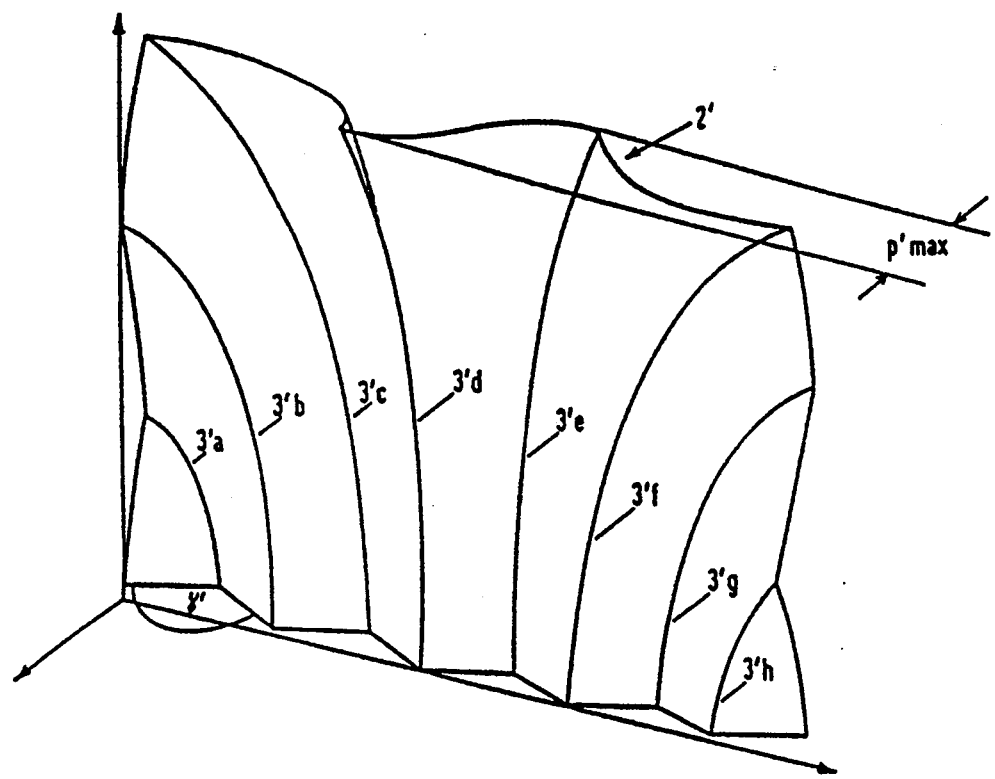

In the exemplary embodiment shown in FIGS. 2a and 2b, a system of arcuately curved bending lines 3'a to 3'h is led, starting from the lamella base, across the lamella 2' in a fan-shaped manner. It will be evident from FIG. 2b that the embossing depth p' of the lamella 2' is not uniform. The maximum embossing depth p' max may here amount up to about 7 mm.

Figure 3A:
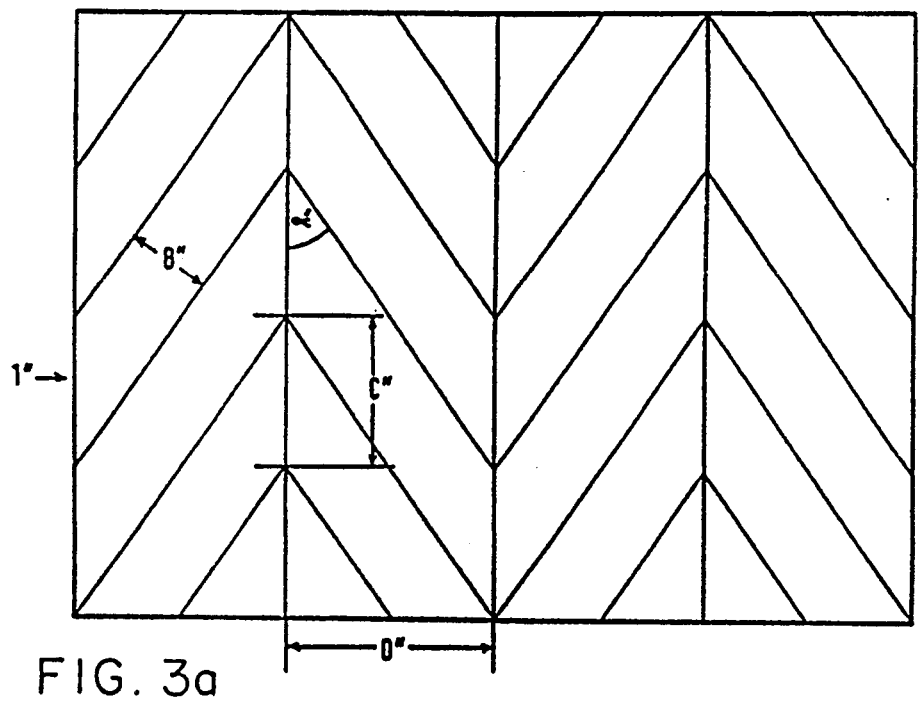
FIG. 3a shows a top plan view of part of a third exemplary embodiment of the inventive tire mold lamella in the form of a planar lamella sheet blank with indicated bending lines.
Figure 3B:
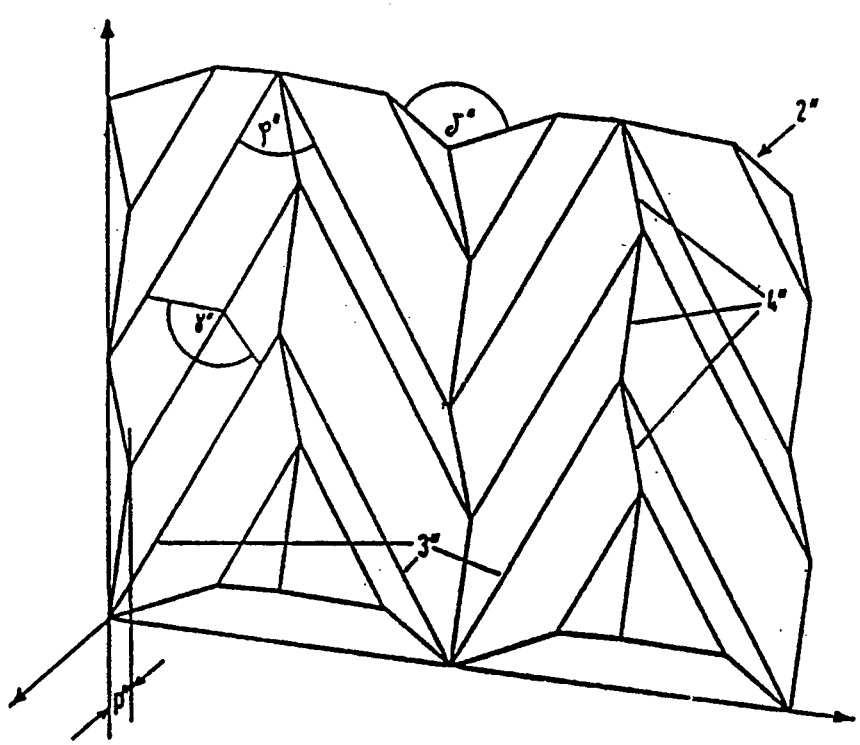

In the exemplary embodiment illustrated in FIGS. 3a and 3b, there are shown in the lamella sheet 1" two systems of predetermined bending lines which extend substantially parallel to each other in each system. The lines which extend in a zig-zag shape in substantially transverse direction, are transformed, during the embossing operation, into zig-zag shaped bending lines 3" which remain in their plane which is substantially parallel to a primary plane defined by the embossed lamella 2". The radially disposed straight lines in the lamella sheet blank 1" are also transformed, during the embossing operation, into zig-zag shaped bending lines 4" which, however, come to lie in their planes substantially perpendicular to the primary plane defined by the embossed lamella 2". The two systems of bending lines 3" and 4" conjointly result in a network of bending lines. In this embodiment, the network of bending lines or edges constitute respective pluralities of four lines or edges which branch from a common area or point in a respective different direction. The individual embossed surfaces which are produced by the embossing operation to form the lamella 2", correspond to parallelograms or rhombi. These surfaces preferably have substantially equal sizes, when considering the entire lamella 2".

In this variant, as illustrated, it is furthermore advantageous if the bending lines 3" which are associated with the transverse direction, as viewed in the transverse direction of the lamella 2", overlap with the next and the next following adjacent bending lines 3". Such overlap may be promoted by reducing the parallelogram angle $\alpha''$ but also by more intensely embossing, resulting in smaller bending angles $\gamma''$, or by a smaller ratio B"/D". The usefulness of the here described overlap resides in that upon wear of the tire there is no abrupt change in the performance of the lamella 2".

In FIG. 3b, there are shown further angles in addition to the angles $\alpha''$ and $\gamma''$. The angle $\delta''$ is the bending angle about the bending line 4" and the angle $\phi'$ is the zig-zag angle of the bending line 3". The following relationships hold with respect thereto:

$$\sin \frac{\phi}{2} = \sin \alpha \cdot \sin \frac{\delta}{2}$$

$$\tan \frac{\phi}{2} = \tan \alpha \cdot \sin \frac{\gamma}{2}$$

Figure 4A:
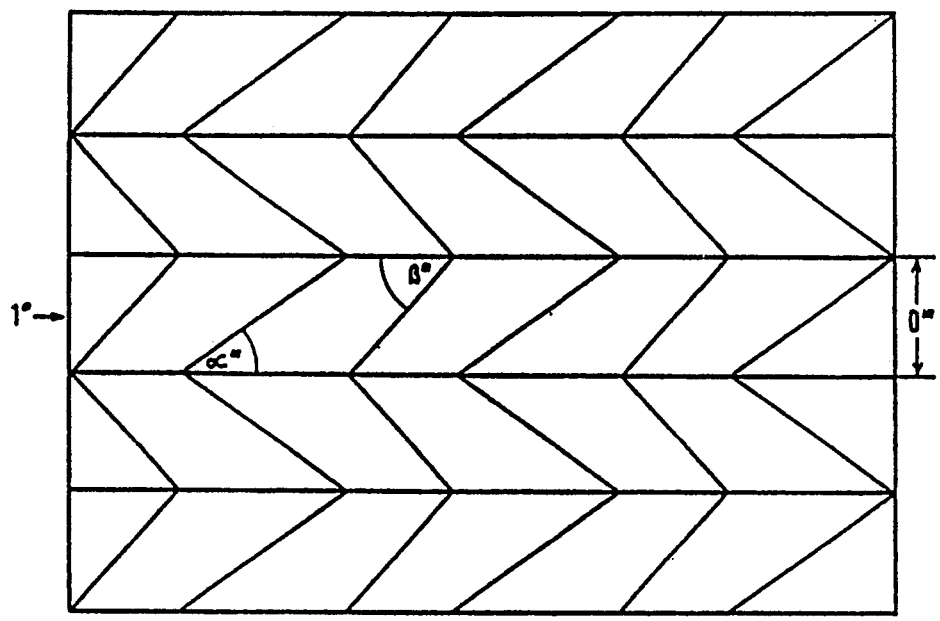
FIG. 4a shows a top plan view of part of a fourth exemplary embodiment of the inventive tire mold lamella in the form of a planar lamella sheet blank with indicated bending lines.
Figure 4B:
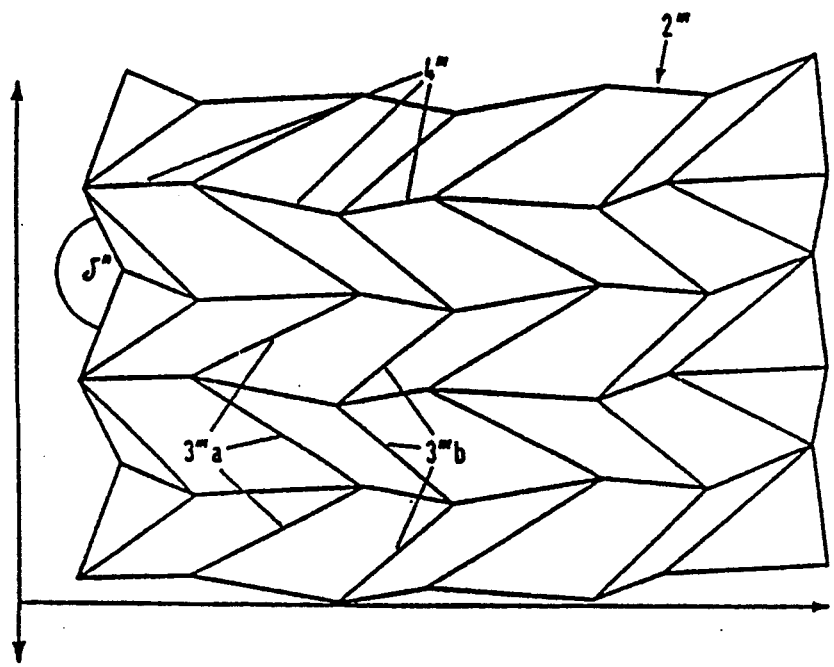

FIGS. 4a and 4b depict a lamella 2''' which differs from the lamella shown in FIG. 3b in two respects. In one respect there has been undertaken a rotation through an angle of about 90°; the bending lines 4''' extend horizontally and an overlap of the bending lines 3''', as illustrated in FIG. 3b, is no longer required. In the other respect there now appear two different types of radially oriented bending lines 3'''a and 3'''b which differ with respect to their zig-zag angles.

As will be further evident from FIG. 4a and 4b, the embossed surfaces thereby degenerate to trapezoids and the lamella 2''' thereby acquires, as viewed in top plan, a curvature which increases with increasing difference between the angles $\alpha'''$ and $\beta'''$ and with decreasing bending angle $\delta'''$. By providing a corresponding sequence of the bending lines 3'''a and 3'''b, a wave configuration, for example, in top plan view may be imparted to the lamella 2''', which wave configuration is advantageous in certain variants of the fine cut-outs or incisions in the tread surface profile. For the axonometric illustration, there has been selected an angle $\delta'''$ of 120°. (It is simpler in this case to operate with the angle $\delta$ instead of the angle $\gamma$ because the bending lines 3a''' and 3b''' cause two different angles $\gamma$).

Figure 5A:
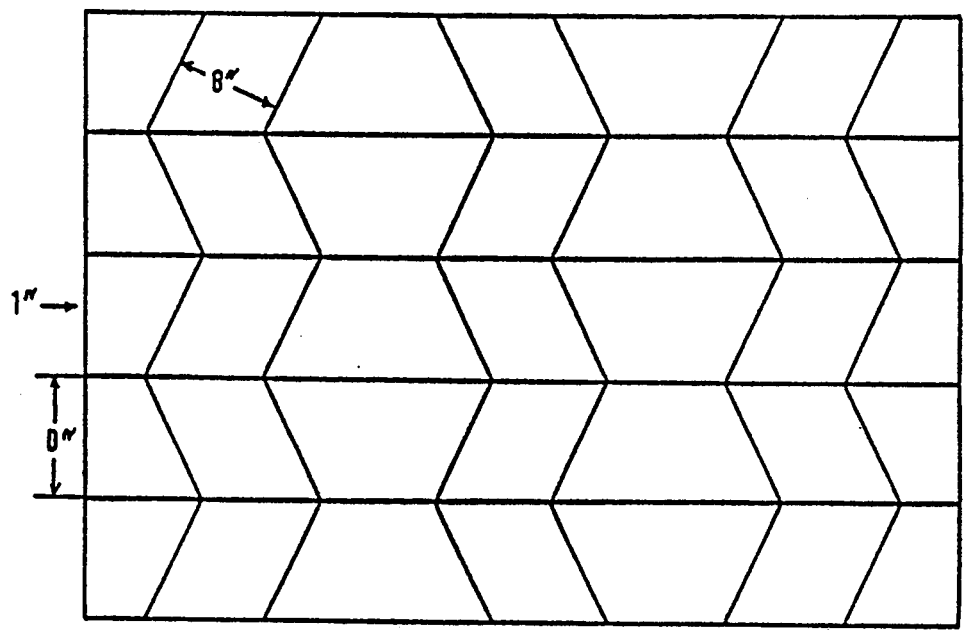
FIG. 5a shows a top plan view of part of a fifth exemplary embodiment of the inventive tire mold lamella in the form of a planar lamella sheet blank with indicated bending lines.
Figure 5B:
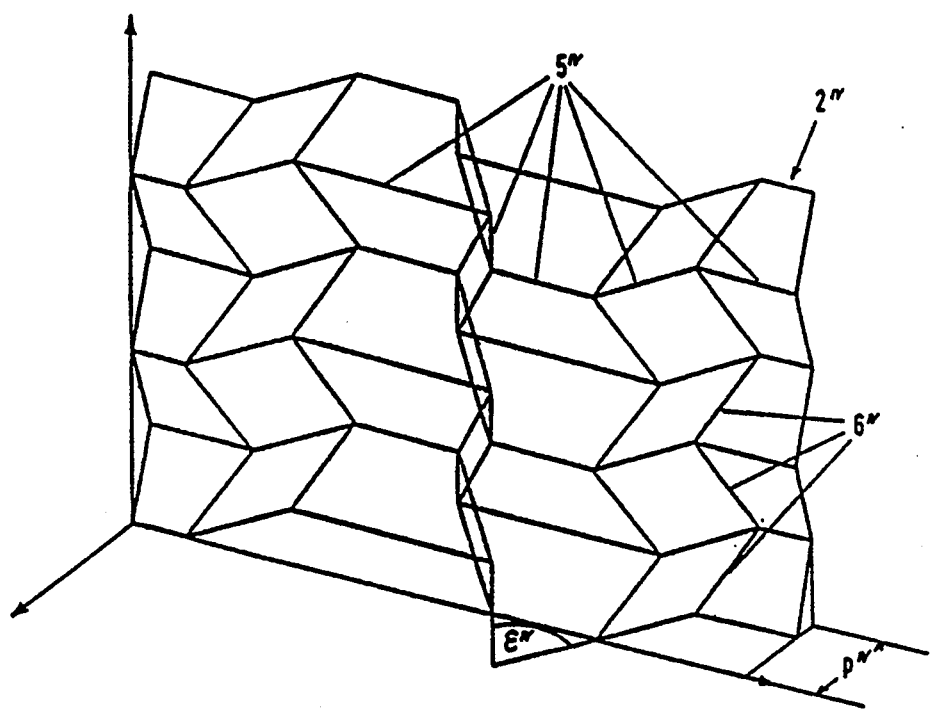

In the exemplary embodiment illustrated in FIGS. 5a and 5b, a specific embossing structure results for the lamella $2^{IV}$ due to the fact that the network consists of non-zig-zag shaped bending lines $5^{IV}$ which extend normally to the plane of the lamella $2^{IV}$ and which are combined with zig-zag shaped bending lines $6^{IV}$ extending at an inclination relative to the plane of the lamella $2^{IV}$, in order to form a network of bending lines. In this structure, the bending lines $6^{IV}$ appear in substantially parallel-extending pairs and adjacent pairs are present in a mirror-image relationship. The embossed structure contains surfaces in the form of substantially equal-sided trapezoids and parallelograms or rhombi. The lamella $2^{IV}$ shows a marked "waviness" in transverse direction which also becomes effective in a relatively great embossing depth $p^{IV}$ which may amount to as much as about 6 mm. In contrast therewith, the structuring in radial direction is relatively small. The bending angle $\epsilon^{IV}$ which is formed by the bending lines $5^{IV}$, has been selected as 60° for the axonometric illustration.

Figure 6A:
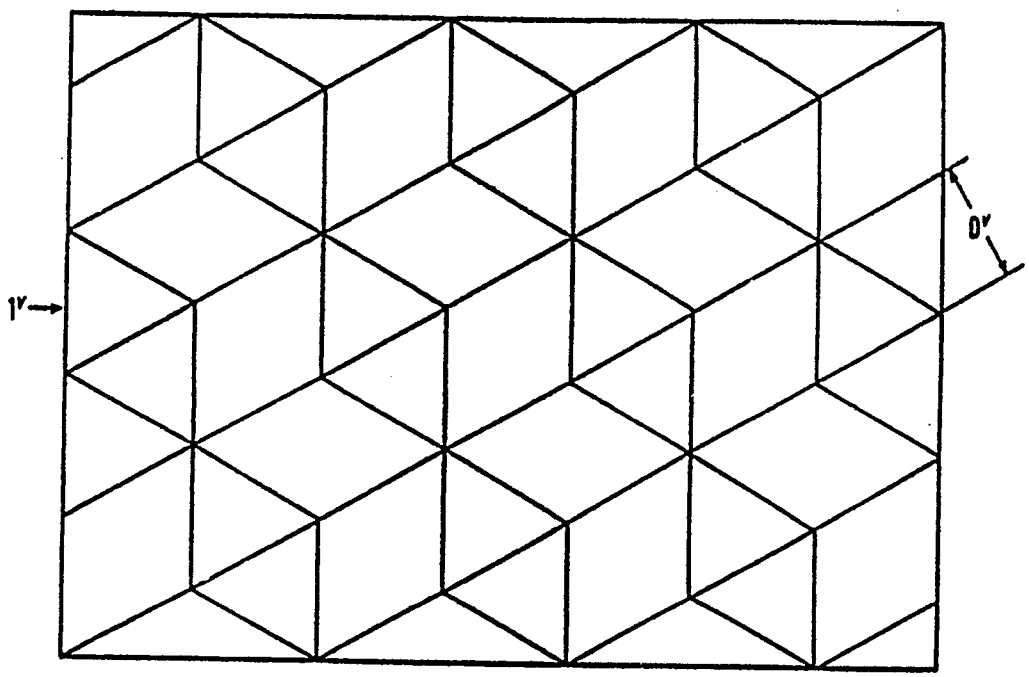
FIG. 6a shows a top plan view of part of a sixth exemplary embodiment of the inventive tire mold lamella in the form of a planar lamella sheet blank with indicated bending lines.
Figure 6B:
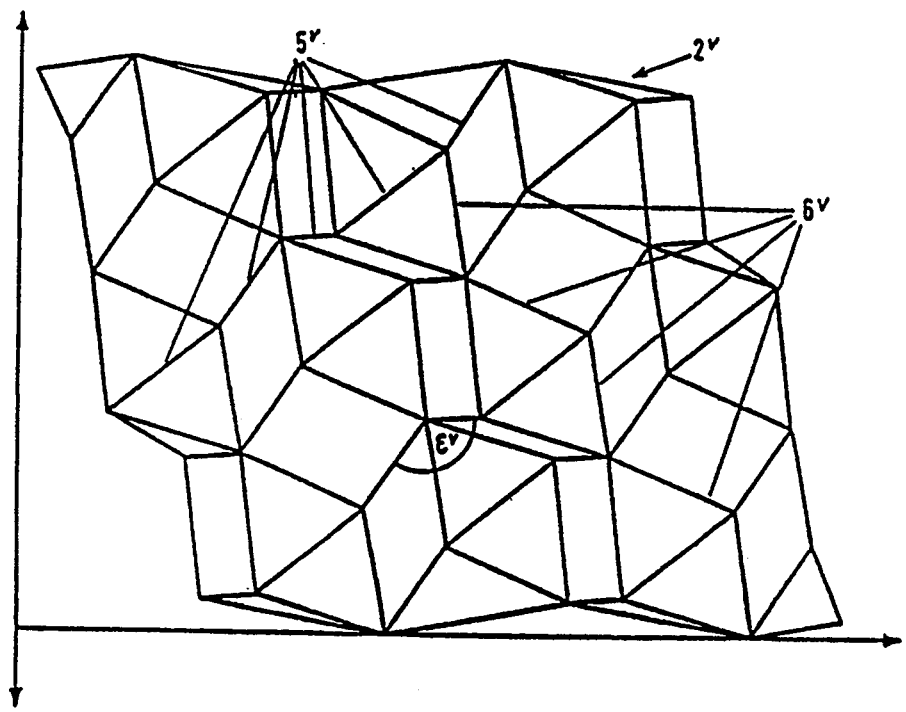

FIGS. 6a and 6b show a modification relative to FIGS. 5a and 5b. Herein the mirror-image relationship is such that the zig-zag shaped bending lines $6^{V}$ contact each other and the embossed structure now is formed by rhombi and triangles. Additionally the network of bending lines has been rotated so that the bending lines $5^{V}$ are no longer in orthogonal disposition. An inclination of the plane of the bending lines $5^{V}$ relative to the transverse direction of the lamella $2^{V}$ in the range of 20° to 70° is preferred. While in FIGS. 4a and 4b the lamella $2^{V}$ abruptly changes its inclination relative to the road upon wear of the tread surface or tread surface strip, this is prevented by the described inclined positioning of the lamella $2^{V}$. Such inclined positioning also may be advantageous with respect to handling, particularly when used in the region of the tire shoulder. The angle $\epsilon^{V}$ is 60°.

Figure 7A:
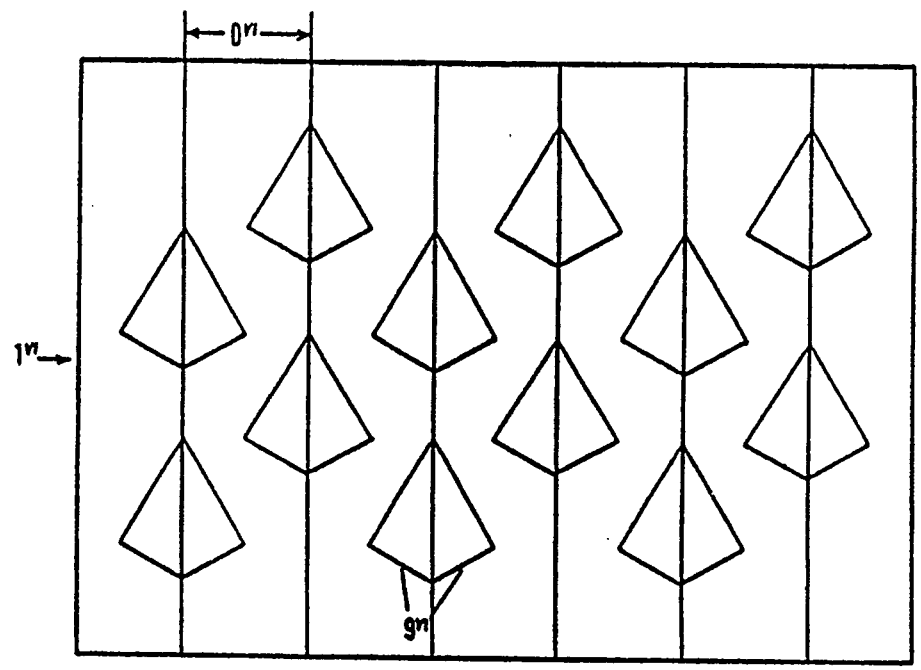
FIG. 7a shows a top plan view of part of a seventh exemplary embodiment of the inventive tire mold lamella in the form of a planar lamella sheet blank with indicated bending lines.
Figure 7B:
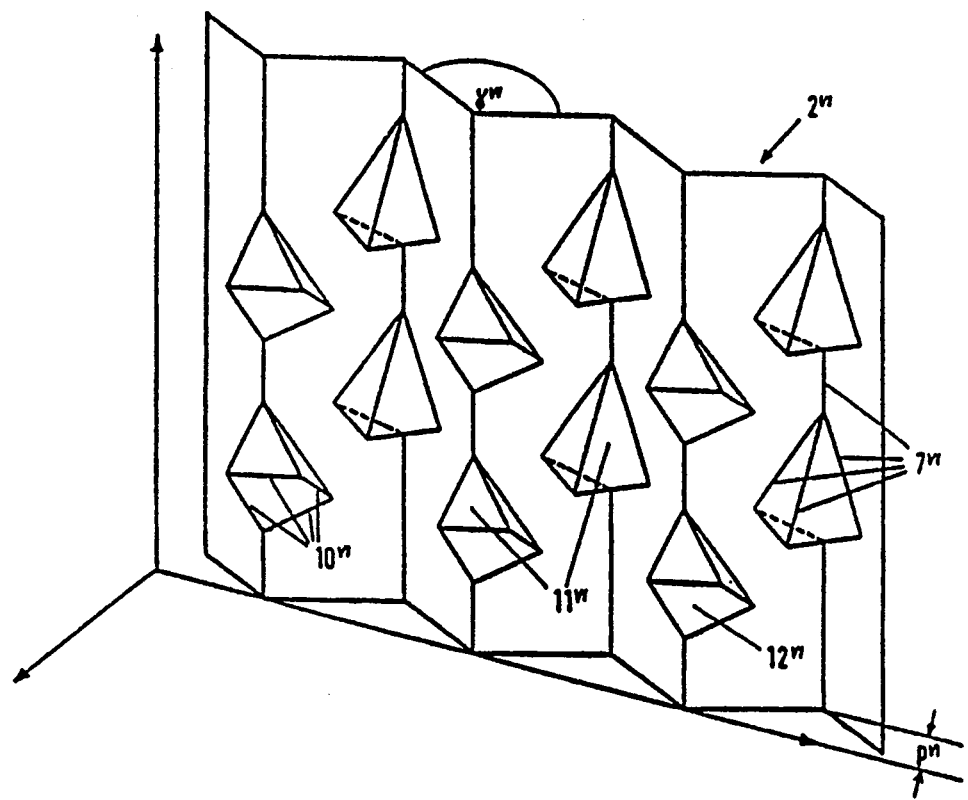

In the exemplary embodiment of the lamella $2^{VI}$ illustrated in FIGS. 7a and 7b, this lamella is provided, as seen in top plan view, with a simple zig-zag or wave-shaped structure such that there are present therein edges and corner regions which extend in the direction of the depth of the fine cut-out or incision. Along such corner regions or edges there are provided receding noses or lugs $11^{VI}$ which are formed by means of a punching operation. Each nose or lug $11^{VI}$ causes a hole or aperture $12^{VI}$ into which a branched bending line $7^{VI}$ or an arcuately curved bending line opens or terminates. During the operation of forming or molding the tire or the heating procedure to which the tire is subjected, the rubber mixture of the tread surface penetrates through the holes or apertures $12^{VI}$. Since the noses or lugs are oriented in radial direction, the tread surface rubber is severed in the region of the holes or apertures $12^{VI}$ during the de-molding operation and the wall structure which is formed thereby in the lamella fine cut-outs or incisions, ensures that the effect to be achieved by the invention is accomplished. The holes or apertures $12^{VI}$ which are formed as a result of the punching operation, should be dimensioned such that there is again present an embossing depth of up to about 2 mm., particularly about 1 mm.

Figure 8A:
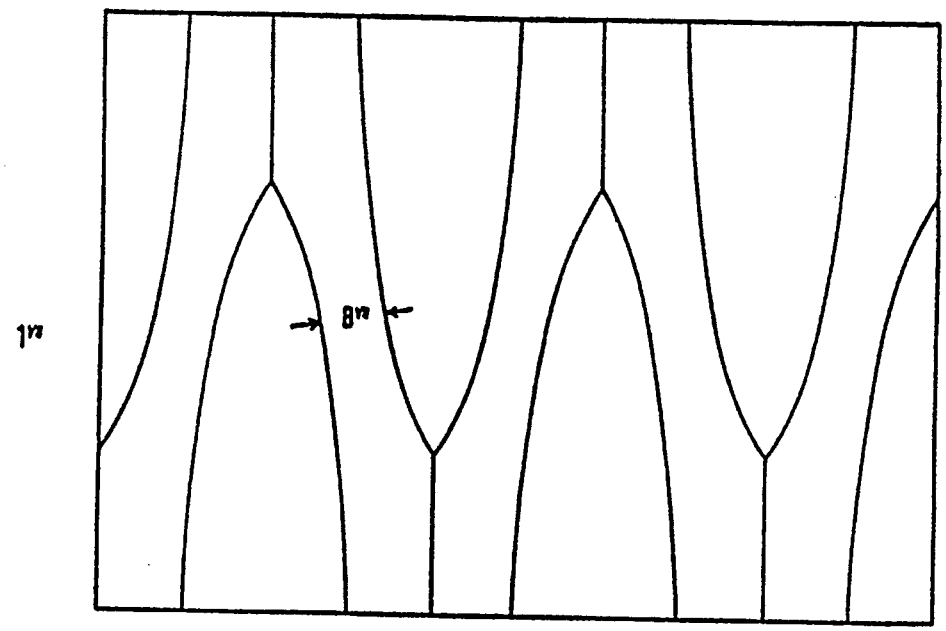
FIG. 8a shows a top plan view of part of an eighth exemplary embodiment of the inventive tire mold lamella in the form of a planar lamella sheet blank with indicated bending lines.
Figure 8B:
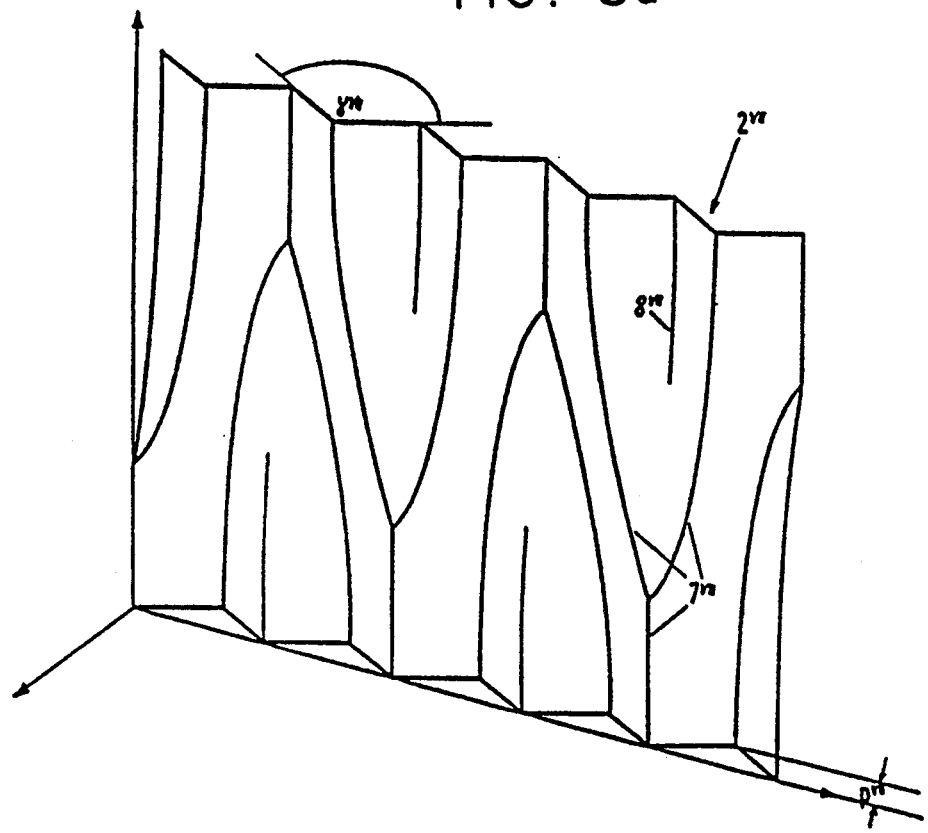

FIGS. 8a and 8b, finally, show an exemplary embodiment of a lamella $2^{VII}$ in which a network of branched bending or kink lines $7^{VII}$ are used and comprise straight and arcuately shaped elements. The a network of branched bending lines $7^{VII}$ are radially disposed and adjacent ones of the branched bending lines $7^{VII}$ are mutually oppositely oriented. It can been seen that there are three edges or lines $7_{VII}$ which branch from a common area or point in a respective different direction. In FIGS. 8a and 8b there also appear isolated bending lines $8^{VII}$ which, however, may also be avoided by correspondingly rounding this section or region of the lamella.

In all of the illustrated exemplary embodiments described hereinbefore, the embossing dimensions can be adapted to each other in a manner such that no or hardly any strains or stresses appear in the material of the lamella sheet during upward and downward embossing of the respective structure. In particular, it is rendered possible in the exemplary embodiments shown in FIGS. 1b to 8b, to have the described and illustrated embossing structure formed by a folding or bending operation from the plane defined by the lamella along the bending lines. It should be self-evident that it would also be possible to tolerate strains or stresses in the lamella sheet which, however, must be kept small, and have the network of bending lines arise from structures which just can not be folded from the plane.

Figure 9:
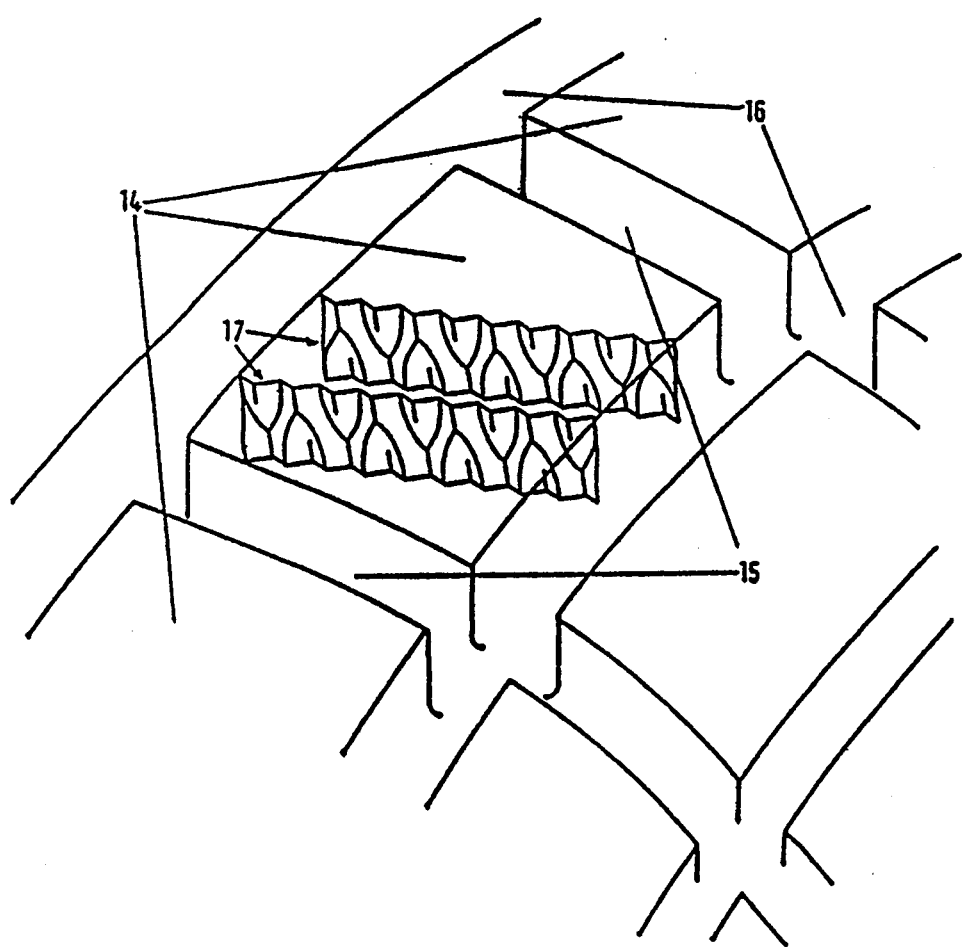
FIG. 9 is an inclined view of a section of a tread surface profile of a pneumatic vehicle tire provided with the inventive lamella fine cut-outs.

FIG. 9 shows a partial region of a tread surface profile in a vehicle tire and which profile comprises lamella fine cut-outs or incisions 17 formed by means of tire mold lamellae structured according to FIGS. 8a and 8b, however, in a version having greater "breadth". This region of the tread surface profile is composed of profile elements in the form of blocks or ribs 14 which are bounded by transverse flutes or furrows 15 or the like and recesses or grooves 16 extending in circumferential direction. The lamella fine cut-outs or incisions 17 provided in each one of the blocks 14, extend in generally transverse direction and open or terminate in the circumferential recesses or grooves 16.

Particularly during braking and accelerating the walls of the fine cut-outs or incisions are urged or pressed against each other due to the block deformations which occur in the contact area or shortly prior to the entry of the blocks into the contact surface or shortly after the exit of the blocks from the contact surface. Due to their structure, the walls of the fine cut-outs or incisions can only slide off each other with difficulty which has the consequence that energy is converted into heat through friction and skid is reduced. Reference is made to the fact that the described and illustrated exemplary embodiments can be modified and/or combined with each other.

In the finished tire, the lamella fine cut-outs or incisions may be constructed in a manner such that there are formed island or isolated cut-outs or incisions, blind hole cut-outs or incisions or cut-outs or incisions which completely traverse the respective profile elements.

While there are shown and described present preferred embodiments of the invention, it is distinctly to be understood the invention is not limited thereto, but may be otherwise variously embodied and practiced within the scope of the following claims.

What is claimed is:

1. A tire comprising:
   a tread surface defining a circumferential direction and having a predetermined profile formed by profile elements;
   said profile elements extending in said circumferential direction;
   said profile elements including lamella fine cut-outs
   said lamella fine cut-outs defining wall regions deviating from a planar shape;
   said wall regions including at least partially three-dimensionally structured wall regions which are associated to each other and comprise protruding and receding edges and surfaces;
   said edges of said three-dimensionally structured wall regions define a network of said edges; and
   said network of edges further comprising respective pluralities of at least three of said edges, each of said at least three edges branching from a common area in a respective different direction.

2. The tire according to claim 1, wherein:
   said profile elements comprise blocks.

3. The tire according to claim 1, wherein:
   said profile elements comprise ribs.

4. The tire according to claim 1, wherein:
   said three-dimensionally structured wall regions define an embossed structure comprising branched edges.

5. The tire according to claim 4, wherein:
   said branched edges are defined by branched bending lines.

6. The tire according to claim 5, wherein:
   said tire defines a radial direction;
   said branched bending lines extending substantially in said radial direction through said three-dimensionally structured wall regions;
   said branched bending lines including adjacent branched bending lines; and
   said adjacent branched bending lines having mutually opposite orientations.

7. The tire according to claim 5, wherein:
   said bending lines including adjacent bending lines;
   said adjacent bending lines extending at a predetermined spacing to each other; and
   said predetermined spacing being in the range of a minimum of 0.5 mm. and a maximum of 5 mm.

8. The tire according to claim 4, wherein:

said network of edges is defined by a network of bending lines.

9. The tire according to claim 8, wherein:
said three-dimensionally structured wall regions define an envelope plane;
said network of bending lines extending substantially parallel to said envelope plane and comprising zig-zag shaped bending lines which are substantially parallel to each other;
further planes extending substantially perpendicular to said envelope plane;
further bending lines extending in said further planes in a zig-zag configuration; and
said further bending lines being combined with said zig-zag shaped bending lines of said network of bending lines.

10. The tire according to claim 9, wherein:
said three-dimensionally structured wall regions have a predetermined wall breadth and defining a transverse direction with respect to said wall breadth;
said zig-zag shaped bending lines being associated with said transverse direction defined by said wall breadth;
a transverse direction being defined with respect to said lamella fine cut-outs;
adjacent bending lines defined relative to each one of said zig-zag shaped bending lines; and
each one of said zig-zag shaped bending lines, when viewed in said transverse direction defined with respect to said lamella fine cut-outs, overlapping at least with an immediately adjacent one of said adjacent bending lines.

11. The tire according to claim 9, wherein:
said tire defines a radial direction;
said zig-zag shaped bending lines being oriented radially in said radial direction;
said radially oriented zig-zag shaped bending lines forming two groups of radially oriented zig-zag shaped bending lines;
said radially oriented zig-zag shaped bending lines defining a zig-zag angle; and
said two groups of radially oriented zig-zag shaped bending lines having different zig-zag angles.

12. The tire according to claim 9, wherein:
said envelope planes of said three-dimensionally structured wall regions have a spacing in the range of 0.5 mm. to 7 mm.

13. The tire according to claim 12, wherein:
said envelope planes of said three-dimensionally structured wall regions have a spacing of 1.8 mm.

14. The tire according to claim 8, wherein:
said three-dimensionally structured wall regions define an envelope plane;
said network of bending lines comprising bending lines which extend substantially perpendicular to said envelope plane and have a non-zig-zag configuration;
zig-zag shaped bending lines extending at a predetermined angle of inclination relative to said envelope plane;
said zig-zag shaped bending lines defining pairs of zig-zag shaped bending lines which extend substantially parallel to each other;
said pairs of zig-zag shaped bending lines being arranged in adjacent pairs having a mirror-image relationship to each other; and said zig-zag shaped bending lines being combined with said bending lines having said non-zig-zag configuration.

15. The tire according to claim 14, wherein:
said pairs of zig-zag shaped bending lines are combined with each other such as to define contact points due to said mirror-image relationship.

16. The tire according to claim 15, wherein:
said three-dimensionally structured wall regions define a transverse direction thereto;
said zig-zag shaped bending lines appearing in said three-dimensionally structured wall regions in a non-orthogonal position; and
said zig-zag shaped bending lines defining planes having a predetermined inclination relative to said transverse direction defined by said three-dimensionally structured wall regions.

17. The tire according to claim 16, wherein:
said predetermined inclination having an angle in the range of 20° to 70°.

18. The tire according to claim 4, wherein:
said tire defines a radial direction;
said lamella fine cut-outs, as seen in top plan view in said radial direction, selectively primarily having a zig-zag or wave-like configuration;
said zig-zag or wave-like configuration of said lamella fine cut-outs defining substantially parallel edges and corner regions;
said substantially parallel edges and corner regions being associated with said radial direction;
protruding and receding lugs being provided along said edges and corner regions;
said branched edges being defined by branched bending lines in said embossed structure; and
each one of said lugs defining an area in which terminates one of said branched bending lines.

19. The tire according to claim 1, wherein:
said lamella fine cut-outs have a thickness which is in the range of 0.4 mm. to 0.8 mm.

20. The tire according to claim 1, wherein:
said lamella fine cut-outs have a predetermined depth; and
said common area from which each of said at least three edges branch in a respective different direction is positioned intermediate said depth for at least a plurality of said respective pluralities.

21. The tire according to claim 1, wherein:
said edges of said three-dimensionally structured wall regions have an arcuately curved configuration.

22. The tire according to claim 1, wherein:
said three-dimensionally structured wall regions define an embossed structure comprising arcuately curved edges.

23. The tire according to claim 22, wherein:
said tire defines a radial direction;
said lamella fine cut-outs, as seen in top plan view in said radial direction, selectively primarily having a zig-zag or wave-like configuration;
said zig-zag or wave-like configuration of said lamella fine cut-outs defining substantially parallel edges and corner regions;
said substantially parallel edges and corner regions being associated with said radial direction;
protruding and receding lugs being provided along said edges and corner regions;
said arcuately curved edges being defined by arcuately curved bending lines in said embossed structure; and each one of said lugs defining an area in which terminates one of said arcuately curved bending lines.

24. A tire comprising:

a tread surface defining a circumferential direction and having a predetermined profile formed by profile elements;

said profile elements extending in said circumferential direction;

said profile elements including lamella fine cut-outs, said lamella fine cut-outs have a predetermined depth;

said lamella fine cut-outs defining wall regions deviating from a planar shape; and said wall regions including at least partially three-dimensionally structured wall regions which are associated to each other and comprise a network of intersecting edges and intersecting surfaces with at least three of said intersecting surfaces extending in different directions from a common point, said common point from which each of said at least three surfaces extend in a respective different direction is positioned intermediate said depth for at least a plurality of said respective pluralities.

* * * * *